Figure 1:
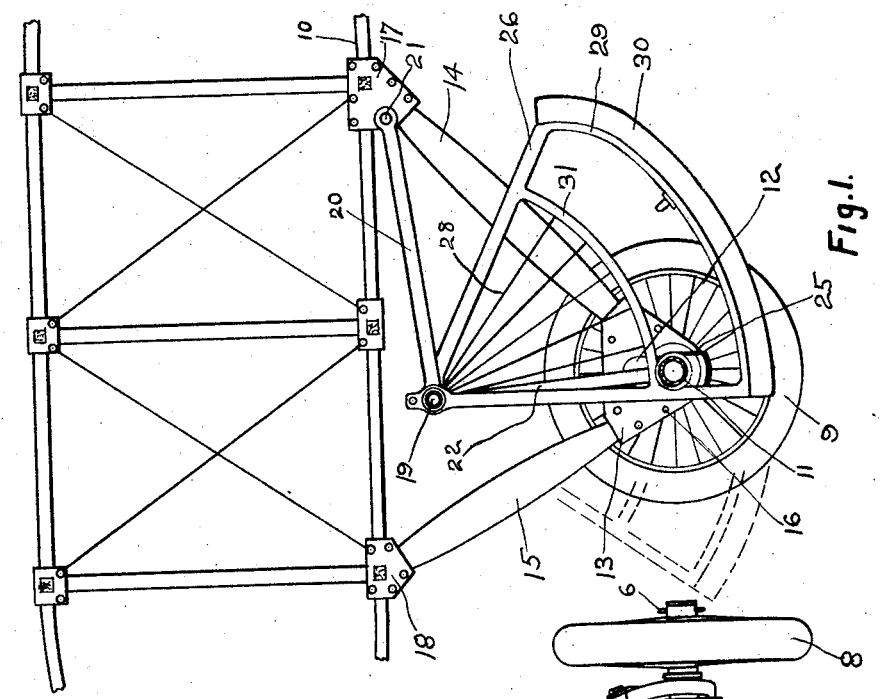
Figure 2:
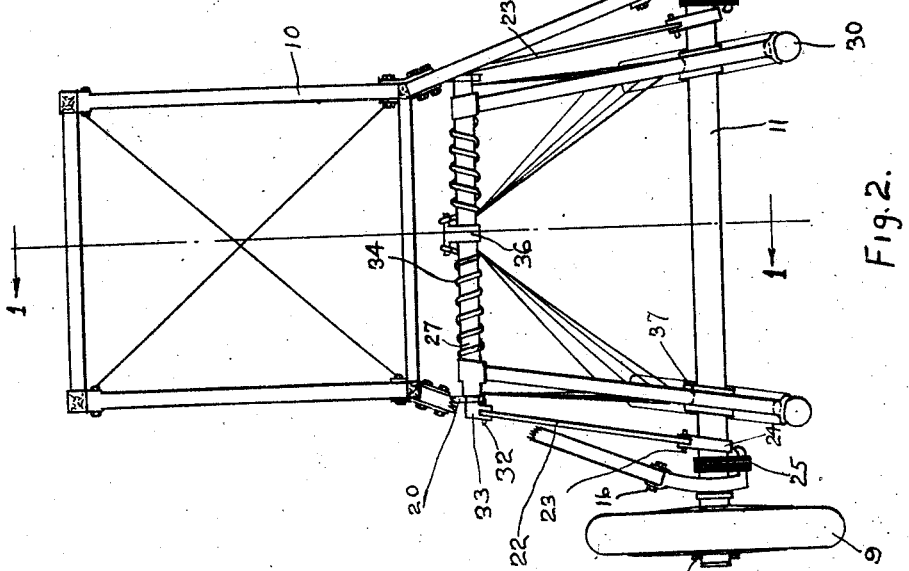

May 8, 1928.

R. S. BLAIR

LANDING GEAR FOR AEROPLANES

Original Filed March 10, 1921

1,668,887

INVENTOR

Robert S. Blair

Patented May 8, 1928.

1,668,887

UNITED STATES PATENT OFFICE.

ROBERT S. BLAIR, OF STAMFORD, CONNECTICUT.

LANDING GEAR FOR AEROPLANES.

Application filed March 10, 1921, Serial No. 451,198. Renewed March 6, 1926.

This invention relates to landing gears for aeroplanes.

One of the objects thereof is to provide a means enabling the aeroplane safely to pass over low obstructions on the landing field both on taking off therefrom or landing thereon. Another object is to make practical a greater angle of incidence when landing. Another object is to enable an aeroplane to safely surmount low walls and fences when landing on or taking off within a restricted field. Other objects will be in part obvious and in part pointed out hereinafter.

The invention accordingly consists in the features of construction, combinations of elements and arrangements of parts which will be exemplified in the structure hereinafter described and the scope of the application of which will be indicated in the following claims.

In the accompanying drawings in which is shown one of various possible embodiments of this invention Figure I is a side elevation in cross section of the landing gear of an aeroplane with the adjacent parts of of the fuselage, taken along the line 1—1 in the direction as indicated by the arrows on Figure II.

Figure II is a rear elevation of the landing gear of an aeroplane with the attached parts of the fuselage in section.

Similar characters refer to similar parts throughout in the several views of the drawings.

Turning now to the drawings, in Figure I we have a section of an aeroplane fuselage 10, an axle 11 bearing two wheels 8 and 9 retained on its ends by the pins 6 and 7 and passing through slot 12 in the connection plate 13 which is fastened to the struts 14 and 15 by suitable bolts such as 16, the struts 14 and 15 in turn being rigidly fastened to the fuselage longerons by the connecting plates 17 and 18. A shaft 19 placed at a convenient distance above and parallel to the axle 11 is linked to the landing gear by means of links 20 swiveled at one end about the end of shaft 19 and connected with the connecting plate 17 by means of the pin 21 and link 22 swiveled about the pin 32 in the lug 33 on the extreme end of shaft 19 and connecting at its other end with pin 23 fixed in lug 24 on the axle 11, link 22 and the connecting means are more clearly shown in Figure II. The axle 11 carries the weight of the superimposed structure of the aeroplane through the heavy elastic cords 25 which are wrapped about the axle tube and a projection on the bottom of plate 13. Swiveled on the shaft 19 is a sector of a wheel 26 which is built up of a light frame work of the general outline as shown in Figure I and is fastened to a sleeve 27 which is journaled on the shaft 19 and is rigidly connected to the wheel sector 26 by the spokes such as 28. The spokes 28 are arranged in the manner which is common in wire wheel construction so that any thrust against the wheel 26 in an axial direction in reference to the shaft 19 will be taken up by the spokes 28 and transmitted to the rest of the mechanism. The wheel sector 26 is built with a double rim; the main rim 29 having mounted upon it the pneumatic tire 30 while the other rim 31 serves as an anchorage for the spokes 28 and the space between the rims 31 and 29 serves as clearance for the axle 11 whenever the wheel sector 26 tends to swing back from its forward limiting position against the axle 11, the rim 29 is substantially arcuate in shape except at its forward end where the radius of curvature is much less than that of the rest of the rim, the curvature of which is taken about the center of the shaft 19. In Figure II the strut 15 is broken away so that the link 22 and the connections at its two ends may be clearly seen. Coiled about the sleeve 27 are the spiral springs 34 and 35 the adjacent ends of which are hooked on to the lug 36 which is integral with shaft 19 and their other ends are secured to the sleeves 27 of the wheel sectors 26 and are in a state of confined torsion the reaction from which tends to rotate the wheel sectors 26 in a counter-clockwise direction about the shaft 19 and normally holds the wheel sector forward against the axle 11. The direction or tendency of rotation of the wheel sector 26 is that as defined in connection with Figure I. Integral with axle 11 as shown in Figure II are the collars 37 which bear against both sides of the adjacent portions of the wheel sector 26 and serve to transmit any side thrust which the wheel sectors 26 may take up to the axle 11 and thereby to the structure of the aeroplane. In the device described there are two wheel sectors similar in construction although but one of them is described herein.

The action of the landing gear in use on an aeroplane is substantially as follows:

Turning to Figure I let us consider the action of the mechanism if the wheels 8 and 9 and the wheel sector 26 encounter an obstruction in the path of the aeroplane which projects above the average level of the surface upon which the aeroplane is taking off from or landing on by an amount greater than that which the wheels 8 and 9 because of their diameter are able to safely roll over. The wheel sector 26 is mounted upon a shaft 19 which is parallel to the axle 11 and situated above the axle 11 and a little bit to the rear. The relationship of the axle 11 to the wheel sector at the center of rotation about shaft 19 varies with different types of aeroplanes and no exact location can be given to shaft 19 although in general it will be so located that the tire 30 on the wheel sector 26 will clear the surface upon which the wheels 8 and 9 are rolling and in case of an obstruction of considerable height being encountered the tire 30 will come in contact with it before the tires of the wheels 8 and 9. If this landing gear should encounter an obstruction approximately equal in height to the radius of the wheels 8 and 9 the wheels alone would be unable to surmount the obstruction and the aeroplane would up-end upon the propeller but the tire of the wheel sector 26 would encounter the obstruction long before the wheels would and due to its swinging about a point which is situated to the rear of the axle 11, would as the aeroplane rolled forward against the obstruction exert a lifting force and would lift the wheels 8 and 9 up off the ground and on to the top of the obstruction when the wheel sector 26 having been carried back, and at the same time the spiral springs 34 and 35 having been wound up by the movement to the position as shown by the dotted outline of it in Figure I, the wheels 8 and 9 would come into contact with the top of the obstruction and take up the weight of the aeroplane. The aeroplane still continuing to go forward the wheels 8 and 9 would roll down from the top of the obstruction to the normal ground surface and wheel sector 26 no longer being in contact with anything would swing forward again by reason of the coil springs 34 and 35 tending to unwind themselves, to the normal position as shown in Figure I ready to lift the wheels over any additional obstructions which might lie in the path of the aeroplane.

The abrupt change in curvature at the forward end of the wheel sector 26 makes more rapid the transference of the weight of the aeroplane from the wheel sector 26 to the wheels 8 and 9 after the wheel sector 26 has carried out the purpose for which it was designed and has swung to the rear. It is to be understood that the correct functioning of the wheel sectors 26 and the connecting mechanism does not depend upon the tire 30 squarely meeting the obstructions in the path of the aeroplane as any obstruction which should present a surface at some oblique angle to the axle 11, the side thrust which consequently results would be transmitted to the wheel sector 26 when it began to lift the aeroplane landing gear over it, and would be taken up by means of the collars 37 on the axle tube 11 which would transmit the side thrust to the axle tube 11 and through that to the fuselage proper.

I claim:

1. In vehicle construction, in combination, a wheel upon which the vehicle is mounted, a swinging device mounted upon the vehicle and normally travelling therewith free from the road and formed and positioned to automatically engage inequalities in the path and swing the vehicle upwardly to surmount the same, said device comprising a plurality of independently swinging members having longer radii than the wheels of the vehicle.

2. In vehicle construction, in combination, a swinging device mounted upon the vehicle at the rear of the forward portion of the body thereof and normally travelling therewith free from the road and formed and positioned to automatically engage inequalities in the path and swing the vehicle upwardly to surmount the same, and a pair of wheels on said vehicle, the axis of said device being at the rear of the axis of said wheels with the parts in normal position of rest.

3. In vehicle construction, in combination, a plurality of wheels having their axes at the rear of the forward portion of the load, a plurality of independently swinging devices having longer radii than said wheels mounted upon the vehicle at points respectively closely adjacent said wheels and normally travelling therewith free from the road and formed and positioned to automatically engage inequalities in the path and swing the vehicle upwardly to surmount the same.

4. In vehicle construction, in combination, a wheel, a swinging device mounted upon the vehicle with its axis above that of said wheel and normally travelling therewith free from the road and formed and positioned to automatically engage inequalities in the path and swing the vehicle upwardly to surmount the same, said device comprising a plurality of laterally converging members.

5. In vehicle construction, in combination, a swinging device mounted upon the vehicle and normally travelling therewith free from the road and formed to automatically engage inequalities in the path and swing the vehicle upwardly to surmount the same, and a wheel, said device comprising a pair of members respectively positioned forwardly of and to the rear of the axis of said wheel and having their lower ends connected by said engaging portion.

6. In vehicle construction, in combination, a swinging device mounted upon the vehicle and normally travelling therewith free from the road and formed and positioned to automatically engage inequalities in the path and swing the vehicle upwardly about its axis to surmount said inequalities, said device comprising a ground engaging member of curved form elongated in the direction of the length of the vehicle and comprising a supporting part and a part of resilient material coextensive in length therewith and curved to fit the same.

7. In vehicle construction, in combination, an airplane fuselage, a landing gear comprising a pair of wheels mounted beneath said fuselage and having a cushioned connection therewith, a pair of swinging devices mounted upon axes above the axes of said wheels and respectively extending closely adjacent said wheels, said devices each having a radius longer than that of the corresponding wheel and normally traveling therewith free from the ground with the wheels on the ground and formed and positioned to automatically engage inequalities in the path, and means connecting said devices with their landing gear and adapted through said cushioned connection to swing the vehicle upwardly to surmount such inequalities.

8. In vehicle construction, in combination, a swinging device mounted upon said vehicle and normally travelling therewith free from the road and formed and positioned to automatically engage inequalities in the path and swing the vehicle upwardly to surmount the same, and cross bracing between said swinging device and said vehicle adapted to transmit all side thrust incurred by said swinging member to said vehicle, said cross bracing being connected with said swinging device at a point substantially spaced below its axis.

9. In vehicle construction, in combination, a vehicle comprising a pair of wheels, a device normally traveling therewith free of the ground and positioned to protrude between and in advance of said wheels and adapted to engage inequalities in the path of the vehicle, and a connection between said device and the frame of the vehicle adapted to permit said device to swing rearwardly with respect to said wheel upon engaging said inequalities to lift said vehicle thereover.

10. In vehicle construction, in combination, an airplane fuselage having below the same a landing gear comprising a pair of wheels with a cushioned connection with the fuselage, a pair of devices normally traveling therewith free of the ground and each respectively positioned to protrude in advance of one of said wheels and engage inequalities in its path, a connection between each said devices and said landing gear adapted to permit said devices independently to move rearwardly with respect to said wheels upon engaging an inequality in its path and to lift said wheels thereupon, said devices being shaped and mounted to automatically reassume a position free of the ground subsequent to raising said wheels, and means extending to each of said devices to brace their lower portions against lateral movement.

11. In vehicle construction, in combination, a vehicle having wheels, a plurality of devices carried by said vehicle traveling normally free of the ground and provided with longitudinally extended portions each adapted to engage inequalities in the path of one of said wheels, said devices being independently movable relative to said wheels and to each other and adapted upon engaging said inequalities to swing downwardly and rearwardly relative to said wheels and lift said vehicle, and lateral bracing extending to said devices at points downwardly spaced from their axes and adapted to resist transverse stresses.

12. In vehicle construction, in combination, a vehicle having wheels, and a plurality of devices carried by said vehicle and each respectively adjacent one of said wheels and traveling normally free of the ground and adapted to engage inequalities in the path of said wheels, said devices comprising longitudinally extending and engaging members mounted to swing independently of each other upon the frame of said vehicle and adapted upon engaging said inequalities to swing said vehicle upwardly.

13. In vehicle construction, in combination, a vehicle having wheels adapted to support the same, a pair of devices mounted to swing independently upon said vehicle respectively at the inner sides of said wheels and closely adjacent thereto and normally traveling therewith free of the ground and formed and positioned to engage inequalities in the path of the vehicle and swing the vehicle upwardly, said devices each being movable about an axis positioned above that of the corresponding wheel.

14. In vehicle construction, in combination, a pair of swinging devices mounted upon a vehicle and normally traveling therewith free from the road, said devices being positioned upon said vehicle provided with a longitudinally extending portion adapted to engage inequalities in the path thereof and swing the vehicle upwardly, and cross-bracing for bracing said pair of devices against side thrust, said bracing being connected with said devices at points substantially below their axes and being adapted to swing with said devices.

15. In vehicle construction, in combination, a swinging device mounted upon said vehicle and normally traveling therewith free from the road and formed and positioned to automatically engage inequalities in the path and swing the vehicle upwardly to surmount the same, said device comprising a curved rim portion and spoke-like members.

16. In vehicle construction, in combination, an airplane fuselage having a landing gear below the same comprising a pair of wheels, a pair of swinging devices mounted beneath said fuselage to swing independently in a downward and rearward direction each closely adjacent one of said wheels on its inner side, said devices normally traveling free from the road with the wheels upon the road and formed and positioned to automatically engage inequalities in the path and swing the vehicle upwardly to surmount the same and each of such length as to swing forwardly into their normal position without engagement with the road and being of a radius greater than that of said wheels.

17. In vehicle construction, in combination, a pair of wheels upon which the vehicle is mounted, a swinging device mounted upon said vehicle between said wheels and normally traveling therewith free from the road and formed and positioned to automatically engage inequalities in the path and swing the vehicle upwardly to surmount the same, said device having a longitudinally extending curved part which engages said inequalities, said device being curved more sharply at its forward end than at the other portions thereof and provided with an engaging surface formed of yielding material.

18. In vehicle construction, in combination, an airplane fuselage having below the same a landing gear comprising a pair of wheels having a cushioned connection therewith, a pair of independently swinging devices mounted beneath said fuselage and normally traveling therewith free from the road and positioned to automatically engage inequalities in the path and swing downwardly and rearwardly to cause the vehicle to surmount the same, said devices each comprising a curved rim portion provided with a rubber tire curved to fit the same and substantially coextensive in length therewith.

19. In vehicle construction, in combination, an airplane fuselage provided with a landing gear provided with a pair of wheels having a cushioned connection therewith, a pair of independently swinging devices mounted between said wheels and respectively adjacent thereto, said devices being positioned to swing about axes above those of said wheels and each of a longer radius than that of said wheels and having curved elongated ground-engaging portions provided with yielding material, and a connection between the pivotal support of said devices and the landing gear whereby said devices upon engaging irregularities in the path of the vehicle independently swing downwardly and rearwardly and tend to lift said vehicle through said cushioned connection to surmount the same.

20. In vehicle construction, in combination, a vehicle having wheels, a swinging device shaped substantially after the contour of a sector of a wheel carried by said vehicle and positioned thereon so that when one of the vehicle wheels approaches a sudden obstacle in its path, said device will engage said obstacle and lift said wheel thereover, and lateral bracing connected with said swinging device at a point substantially beneath its axis adapted to resist lateral displacement thereof.

21. In vehicle construction, in combination, a vehicle having a plurality of wheels and means upon said vehicle for each of said wheels comprising a device fashioned after the shape of a wheel portion having a greater radius than the vehicle wheels and adapted when a wheel approaches an obstacle to engage said obstacle and carry the vehicle thereover in raised position so that said wheel clears said obstacle.

22. In landing gear for airplanes, in combination, a fuselage, a pair of wheels adapted to support said fuselage, a pair of swinging devices respectively associated with said wheels and having pivotal supports respectively above the axes of said wheels upon which they are mounted to swing independently of each other, said devices having a lower longitudinally extending portion normally positioned clear of the ground and projecting in advance of the corresponding wheel to engage irregularities in its path, and means connecting each wheel and the pivotal support of the corresponding device with said fuselage to permit each wheel and the corresponding device to move upwardly relative to said fuselage, said means comprising yielding means resisting said relative movement whereby irregularities in the path of either of said wheels may be yieldingly engaged either by that wheel or the longitudinally extending portion of the corresponding device.

23. In landing gear for airplanes, in combination, a fuselage, a pair of wheels adapted to support said fuselage, a pair of swinging devices respectively associated with said wheels and having pivotal supports respectively above the axes of said wheels upon which they are mounted to swing independently of each other, said devices having a lower longitudinally extending portion normally positioned clear of the ground and projecting in advance of the corresponding wheel to engage irregularities in its path, and means connecting each wheel and the pivotal support of the corresponding device with said fuselage to permit each wheel and the corresponding device to move upwardly relative to said fuselage, said means maintaining the lower portions of each wheel and of the corresponding device at substantially the same relative height and comprising yielding means to resist the movement of said devices and said wheels relative to said fuselage and inclined bracing means extending to each of said devices and connected to swing therewith.

24. In landing gear for airplanes, in combination, a fuselage, a pair of supporting members extending downwardly from each side of said fuselage and converging toward each other in a downward direction, the members of each pair being positioned one substantially behind the other, a pair of wheels respectively mounted adjacent the converging lower ends of said supporting members, yielding means adapted to permit and resist relative upward movement of said wheels with respect to said fuselage, and a pair of swinging devices respectively associated with said wheels and each having a pivotal support above that of the axis of the corresponding wheel and being of a radius substantially greater than that of the corresponding wheel and having a lower longitudinally extending portion normally clear of the ground and extending in advance of the corresponding wheel to engage irregularities in its path and adapted through said pivotal support to lift said fuselage as it swings rearwardly upon engaging said irregularities.

25. In airplane construction, in combination, a fuselage, a pair of wheels adapted to support said fuselage, a pair of devices respectively mounted adjacent each of said wheels and movable relative thereto and relative to each other, each of said devices comprising a portion extending in advance of the corresponding wheel in an upwardly inclined position and adapted upon engagement with irregularities in the path of said wheel to move downwardly and rearwardly and gradually lift said fuselage, said portion being less abrupt than the corresponding portion of the corresponding wheel and in all its positions being at a greater height than the lowermost portion of the corresponding wheel, yielding means adapted to resist upward movement of said devices and wheels with respect to said fuselage, and means bracing the lower portions of each of said devices against lateral movement.

Signed at Stamford in the county of Fairfield and State of Connecticut this 5th day of March A. D. 1921.

ROBERT S. BLAIR.